United States Patent
Tsong (10) Patent No.: US 11,066,164 B1
(45) Date of Patent: Jul. 20, 2021

(54) SECURE REMOTE ACCESS TO COMPONENTS OF AN UNMANNED AERIAL VEHICLE

(71) Applicant: Amazon Technologies, Inc., Seattle, WA (US)

(72) Inventor: Wan-Kit Allen Tsong, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 128 days.

(21) Appl. No.: 16/141,518

(22) Filed: Sep. 25, 2018

(51) Int. Cl.
*B64C 39/02* (2006.01)
*H04L 29/06* (2006.01)
*H04L 9/32* (2006.01)
*H04W 4/40* (2018.01)
*G05D 1/00* (2006.01)

(52) U.S. Cl.
CPC .......... *B64C 39/024* (2013.01); *H04L 9/3247* (2013.01); *H04L 9/3268* (2013.01); *H04L 63/0823* (2013.01); *B64C 2201/146* (2013.01); *G05D 1/0022* (2013.01); *H04W 4/40* (2018.02)

(58) Field of Classification Search
CPC .................................................... B64C 39/024
See application file for complete search history.

(56) References Cited

U.S. PATENT DOCUMENTS

| | | | | |
|---|---|---|---|---|
| 2014/0164768 A1* | 6/2014 | Kruglick | ............... | H04W 12/02 713/168 |
| 2016/0274578 A1* | 9/2016 | Arwine | ............... | G06F 21/6209 |
| 2017/0286651 A1* | 10/2017 | Erhart | .................... | G06F 21/31 |
| 2017/0374190 A1* | 12/2017 | Dowlatkhah | ..... | H04M 1/72533 |
| 2018/0103036 A1* | 4/2018 | Fox | ........................ | F42B 12/46 |

* cited by examiner

*Primary Examiner* — Imran K Mustafa
(74) *Attorney, Agent, or Firm* — Thomas | Horstemeyer, LLP (57) ABSTRACT

Disclosed are various embodiments for providing secure remote access to various components of an unmanned aerial vehicle (UAV), for instance, during a flight of the UAV or when the UAV is at a predetermined location. A computing environment may configure an unmanned aerial vehicle to permit access to the unmanned aerial vehicle when presented with a digital certificate signed by a trusted certificate signing service. Further, the computing environment may authenticate a client device requesting access to the unmanned aerial vehicle to perform a configuration and generate a digital certificate signed by the trusted certificate signing service that enables encrypted communication between the client device and the unmanned aerial vehicle.

20 Claims, 6 Drawing Sheets

SECURE REMOTE ACCESS TO COMPONENTS OF AN UNMANNED AERIAL VEHICLE

BACKGROUND

Unmanned aerial vehicles (UAVs) are often controlled or otherwise directed remotely in response to instructions communicated by a pilot operating a device or a flight service executing on a device. Some unmanned aerial vehicles communicate remotely with these devices through use of a cellular network, satellite-based communication system, or other communication medium. As a result, in various locations, unmanned aerial vehicles may lose communication with various devices and may need to operate autonomously.

Some types of computing devices may permit remote configuration. There may be times when automated configuration deployment may failed and requires an engineer to troubleshoot or perform manual changes. For instance, information technology (IT) administrators or automated software may remotely access a computing device to adjust software or hardware settings of the device. To do so, authentication information for the administrators is often stored locally on the computing device and used for authentication. However, in light of enterprises having hundreds to thousands of geographically-distributed computing devices, storing, maintaining, and updating a constantly changing list of authorized administrators is problematic, especially if communication with the devices is often sporadic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for providing secure remote access to various components of an unmanned aerial vehicle (UAV), for instance, while the UAV is at a predetermined location. The unmanned aerial vehicles described herein may be configured to permit remote configuration. For instance, administrators of a flight service that oversee operation of unmanned aerial vehicles may remotely access a controller onboard an unmanned aerial vehicle to change settings, update drivers or other software, or perform similar operations when automated methods fail. To do so, authentication information for the administrators may be stored locally on the unmanned aerial vehicles. The unmanned aerial vehicles may then use the locally stored information to authenticate the administrators when an administrator or an automated service attempts to remotely login. However, there is often a changing list of authorized administrators trying to access a growing array of vehicles in a fleet. Due to administrators requiring access to various ones of the unmanned aerial vehicles, it is not feasible to maintain and constantly update user access credentials on every vehicle in a fleet in a timely manner, especially when communication with the vehicles may be sporadic.

According to various embodiments described herein, a centralized security approach may be employed to authenticate administrators and configure one or more unmanned aerial vehicles (UAVs). To this end, an unmanned aerial vehicle may be configured to permit remote or local access to the unmanned aerial vehicle when presented with a digital certificate signed by a trusted certificate signing service. A computing environment, acting as a centralized security service, may authenticate client devices requesting access to the unmanned aerial vehicle, such as those devices attempting to perform configurations of the unmanned aerial vehicle. The client devices may be authenticated based on roles of user accounts associated with the client devices, one-time passwords (OTPs), local authentications performed on the client devices and types thereof, a current location of the unmanned aerial vehicle, as well as other information as will be discussed.

The computing environment may generate a digital certificate signed by a trusted certificate signing service and the digital certificate may be sent to an authenticated client device, where the digital certificate enables encrypted communication to occur between the client device and the unmanned aerial vehicle. In some embodiments, remote configuration of an unmanned aerial vehicle may occur while the unmanned aerial vehicle is in flight. The digital certificate may include a certificate that includes a public key for a user account in some embodiments, or other asymmetric key certificate. In additional embodiments, the digital certificate may include a public key encrypted using a private key of a certificate signing service, a validity period, a one-time password, as well as other data, as will be described.

Configuring an unmanned aerial vehicle may include adjusting a motor speed setting of the unmanned aerial vehicle, updating firmware or software of the unmanned aerial vehicle, adjusting a setting of an onboard camera of the unmanned aerial vehicle, adjusting a battery setting of a battery of the unmanned aerial vehicle, a flight setting, or otherwise directing navigation of the vehicle, as well as other tasks described herein. In the following discussion, a general description of the system and its components is provided, followed by a discussion of the operation of the same.

Figure 1:
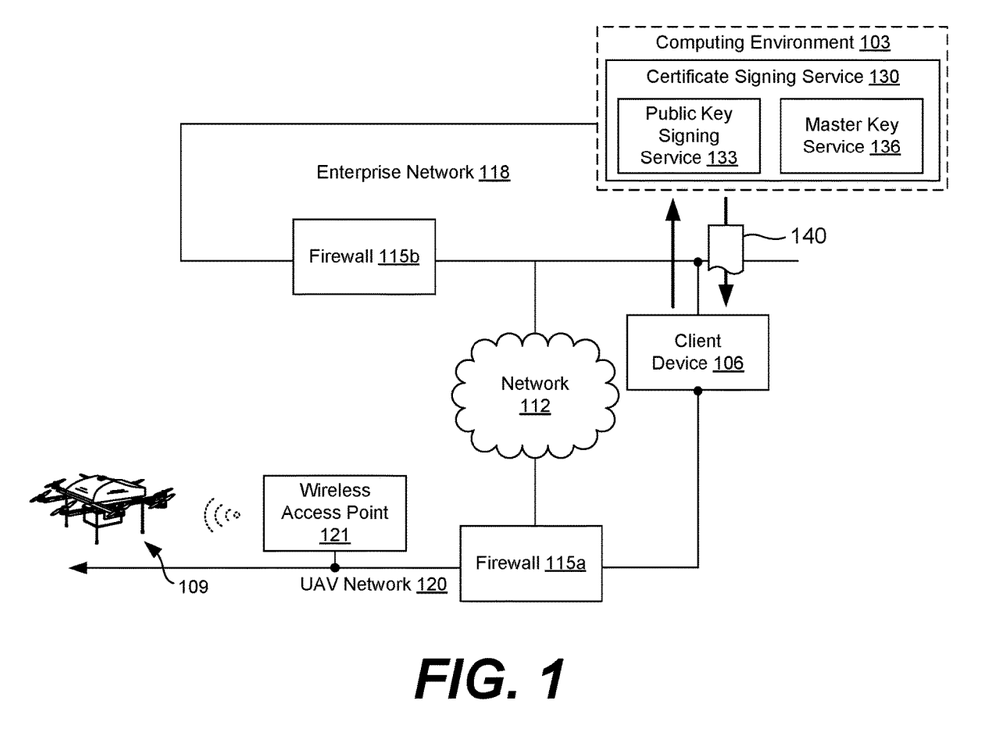
FIGS. 1 and 2 are drawings of a networked environment according to various embodiments of the present disclosure.

Referring now to FIG. 1, a networked environment 100 is shown according to various embodiments. The networked environment 100 includes a computing environment 103, a client device 106, and an unmanned aerial vehicle 109, which are in data communication with each other via a network 112. The network 112 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The networked environment 100 may include one or more firewalls 115a and 115b (collectively, "firewalls 115"). The firewalls 115 may include a service that monitors incoming and outgoing network traffic using predetermined security rules and, in some instances, determine whether to permit incoming or outgoing traffic. As such, the firewalls 115 may act a barrier between a trusted internal network, such as an enterprise network 118 or a UAV network 120, and an untrusted external network, such as the Internet.

According to various embodiments, the unmanned aerial vehicle 109 may include a land-based aircraft, a seaplane, an amphibian aircraft, a helicopter, a dirigible (also referred to as an airship), a gyrocopter, a tilt-wing aircraft, a glider, a sailplane, or any other type of vehicle as may be appreciated. For embodiments in which the unmanned aerial vehicle 109 is a helicopter, the unmanned aerial vehicle 109 may include a single- or multi-rotor helicopter. It is understood that while being as an "unmanned" vehicle, the unmanned aerial vehicle 109 may be remotely manned. In other words, the unmanned aerial vehicle 109 may be piloted remotely. In other embodiments, the unmanned aerial vehicle 109 may be fully autonomous based on a set of instructions predefined for the vehicle.

To communicate over the network 112, the unmanned aerial vehicle 109 may be equipped with a cellular network module, such as a global system for mobile communications (GSM) transceiver or a code division multiple access (CDMA) transceiver. However, in some embodiments, the unmanned aerial vehicle 109 may communicate through a satellite network and, thus, may be equipped with a satellite communication module. In further embodiments, the unmanned aerial vehicle 109 may communicate using wireless fidelity (Wi-Fi), Bluetooth®, ZigBee, or other communication medium. In any event, the unmanned aerial vehicle 109 may interact with the network 112 by sending or receiving communications wirelessly through a wireless access point 121, which may include a cellular network tower, a satellite, a Wi-Fi access spot, a repeater, or similar device depending on the communication medium.

An administrator or an automated service may desire to perform configurations of the unmanned aerial vehicle 109. For instance, the administrator or service may desire to update a flight-related setting or perform other updates related to a scheduled flight. Similarly, the administrator or the service may desire to perform routine configurations or updates of the unmanned aerial vehicle 109, for instance, when the unmanned aerial vehicle 109 is landed and stored in a fulfillment center, hangar, or other facility. While being described in the singular, the unmanned aerial vehicle 109 may be one of a plurality of unmanned aerial vehicles 109. As such, the digital certificate 140 may enable encrypted communication between the client device 106 and a subset of the plurality of unmanned aerial vehicles 109 for which the client device 106 is authorized.

To do so, the administrator may interact with a client device 106, such as a personal computer, a laptop, a smartphone, or other device as will be discussed. Alternatively, an automated service may execute on a client device 106. As opposed to attempting to remotely log-in to the unmanned aerial vehicle 109, the client device 106 may first interact with the computing environment 103. For instance, the administrator may execute a client application (also referred to as a software client) to, or the automated service may automatically, generate a request that is sent to the computing environment 103 over the network 112. In various embodiments, the computing environment 103 may include a certificate signing service 130 that acts as a centralized authentication service for devices desiring to interact with one or more unmanned aerial vehicles 109 in a fleet. The certificate signing service 130 may include a public key signing service 133, a master key service 136, as well as other services depending on a desired type of digital certificate generated.

As such, the client device 106 may communicate a request for a digital certificate to the certificate signing service 130, where the request may be specific to an unmanned aerial vehicle 109 or a group of unmanned aerial vehicles 109 for which the administrator or the automated service desires to configure. In some embodiments, the request may include a public key unique to the client device 106 or a user account associated with the client device 106.

The certificate signing service 130, or other service of the computing environment 103, may authenticate the request, for instance, based on whether a user account for the administrator is authorized to access or configure one or more of the unmanned aerial vehicles 109 in a fleet. Additionally, in some embodiments, the certificate signing service 130 may only authenticate the request if the client application executing on the client device 106 implements a two-factor authentication or other type of required security measure.

In some embodiments, the certificate singing service 130 may store the public key for the client device 106 or the user account, for instance, in a database or other memory. Further, the certificate signing service 130 may determine whether a user account is associated with a role that permits the user account to access or configure the unmanned aerial vehicle 109 (or group of unmanned aerial vehicles 109) identified in the request. A role can include a security level associated with the user account or a title of the employee, such as "flight administrator" or other title or value indicating that the user account has sufficient permissions to access one or more unmanned aerial vehicles 109.

If a user account associated with a client device 106 is authenticated, the public key signing service 133 may use the public key identified for the user account to generate a digital certificate 140. It is understood that a public-private key pair may be generated. For instance, each client device 106 may maintain a pair of cryptographic keys including a public key and a private key. The public key may be accessible by other devices or services, while the private key is known only to the client device 106. The public and the private keys in a pair are related mathematically, such that the client device 106 can decrypt communications received by an unmanned aerial vehicle 109 that were encrypted using a public key specified in a digital certificate 140.

Further, the certificate signing service 130 may specify a validity period in the digital certificate 140, where the validity period includes a predetermined time range during which the digital certificate 140 is valid. The predetermined time range may include, for instance, twenty four hours or other suitable time range sufficient to perform a particular interaction, such as downloading data, installing a software update, or other task described herein. As may be appreciated, any requests to interact with an unmanned aerial vehicle 109 outside of the predetermined time range may be denied or a request for a new digital certificate 140 may be generated.

Once the computing environment 103 has generated the digital certificate 140, the digital certificate 140 may be sent to the client device 106 from which the request was originated. The digital certificate 140 may enable encrypted communication to occur between the client device 106 and the unmanned aerial vehicle 109 over the network 112.

Figure 2:
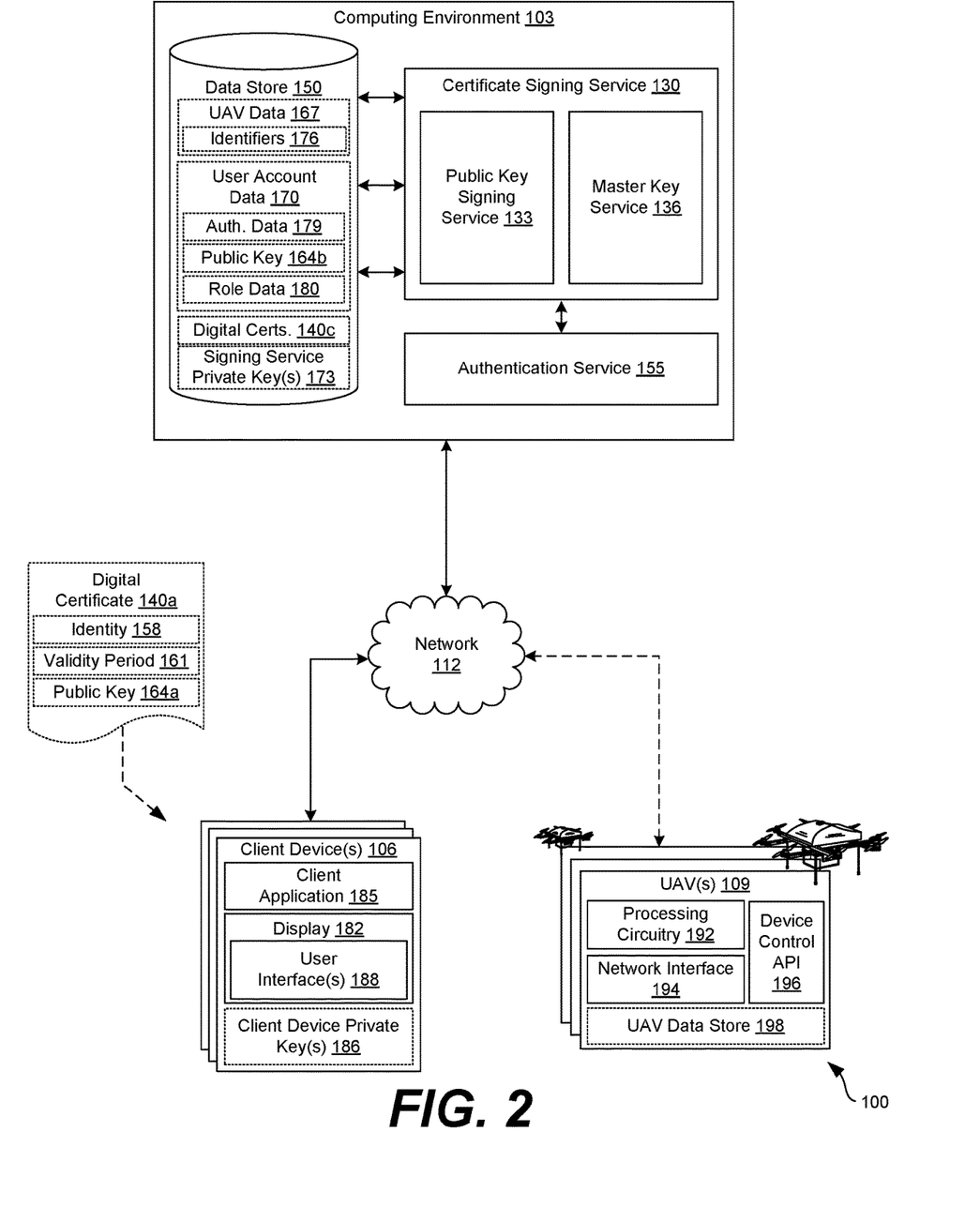

With reference to FIG. 2, another view of the networked environment 100 is shown according to various embodiments. The computing environment 103 may comprise, for example, one or more server computers or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource or other distributed computing arrangement. In some cases, the computing environment 103 may correspond to an elastic computing resource where the allotted capacity of processing, network, storage, or other computing-related resources may vary over time.

Various applications, services, or other functionality may be executed in the computing environment 103 according to various embodiments. Also, various data is stored in a data store 150 that is accessible to the computing environment 103. The data store 150 may be representative of a plurality of data stores 150 as can be appreciated. The data stored in the data store 150 for example, is associated with the operation of the various applications and/or functional entities described below.

The components executed on the computing environment 103, for example, include the certificate signing service 130, an authentication service 155, and other applications, services, processes, systems, engines, or functionality not discussed in detail herein. The certificate signing service 130 is executed to generate and/or sign a digital certificate 140a . . . 140c such that the digital certificate 140 will be trusted by an unmanned aerial vehicle 109. In some embodiments, the certificate signing service 130 may generate or sign a digital certificate 140 that may be used in an asymmetric cryptographic scheme. In other embodiments, the certificate signing service 130 may generate other types of digital certificates 140.

The digital certificate 140 may comprise various fields, such as an identity 158. The identity 158 may include an issuer name (e.g., a name of the certificate signing service 130), an issuer unique identifier, or other information. Additionally, the digital certificate 140 may include a validity period 161, a public key 164a, 164b, a public key algorithm, a subject name, a subject unique identifier, a certificate signature, a certificate signature algorithm, as well as other information. The validity period 161 may include a predetermined period of time for which the digital certificate 140 is valid to access or configure an unmanned aerial vehicle 109. In some embodiments, the validity period 161 comprises a "not before" value specifying a time before the digital certificate 140 is valid and a "not after" value specifying a time after the digital certificate 140 has expired.

The authentication service 155 is executed to authenticate the client devices 106 or user accounts associated with the client devices 106. In other words, the authentication service 155 is executed to determine whether a user of a client device 106 has requisite permissions to access or configure one or more of the unmanned aerial vehicles 109.

The data stored in the data store 150 includes, for example, UAV data 167, user account data 170, digital certificates 140, a signing service private key 173, and potentially other data. The UAV data 167 may include information pertaining to the unmanned aerial vehicles 109, such as unique identifiers 176 for the unmanned aerial vehicles 109, flight plans or flight data, current configurations, vehicle capabilities, as well as other data.

The user account data 170 may include authentication data 179 that may be used by the authentication service 155 to authenticate a client device 106 or user account associated therewith. In some embodiments, the authentication data 179 may include a personal identification number (PIN), an alpha-numeric password, device identifiers or other device data, biometric data, such as a fingerprint or voice recording, or other authentication data 179.

The user account data 170 may also include a public key 164 that may correspond to a user account in some embodiments. Further, the user account data 170 may include role data 180 specifying a role associated with a user account. For instance, assuming an administrator of a flight service comprises a user account of the computing environment 103 the role may include "flight service administrator" or similar role that can be analyzed to determine whether the user account has sufficient permission to operate on one or more unmanned aerial vehicles 109.

The client device 106 is representative of a plurality of client devices that may be coupled to the network 112. The client device 106 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 182. The display 182 may include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 106 may be configured to execute various applications such as a client application 185 and/or other applications. The client application 185 may be executed in a client device 106, for example, to access network content served up by the computing environment 103 and/or other servers, thereby rendering a user interface 188 on the display 182. To this end, the client application 185 may include, for example, a secure socket shell (SSH) client, a browser, a dedicated application, etc., and the user interface 188 may include a terminal screen, a network page, an application screen, etc. The client device 106 may be configured to execute applications beyond the client application 185 such as, for example, email applications, social networking applications, word processors, spreadsheets, and/or other applications. The client device 106 may further include a client device private key 186 that may be unique to the client device 106 in some embodiments. Further, the client device private key 186 may be used to perform asymmetric encryption-decryption routines based on the public key 164.

The unmanned aerial vehicle 109 may include, for instance, processing circuitry 192, a network interface 194, as well as other hardware or software. For instance, in some embodiments, the unmanned aerial vehicle 109 may include one or more imaging devices, a battery, an engine, a cargo bay, a payload (e.g., an item to be deliver), a rotor or other aerodynamic lift and propelling system, or other component as may be appreciated.

The processing circuitry 192 may oversee operation of the unmanned aerial vehicles and, in various embodiments, the processing circuitry 192 may be configured to execute one or more applications such as an aircraft control application or a flight control application. To this end, the processing circuitry 192 may include a hardware processor, memory, a data bus, as well as other hardware which can be included on one or more controllers, microcontrollers, or other hardware. In some embodiments, the functions of the applications of the unmanned aerial vehicle 109 may be performed by logic gates, application specific integrated circuits (ASICs) having appropriate logic gates, field-programmable gate arrays (FPGAs), or other components, etc.

In some embodiments, the unmanned aerial vehicle 109 may include a device control application programming interface (API) 196. The device control API 196 may include routines, functions, or programmatic calls that may be invoked by a user of the client device 106 remotely to configure the unmanned aerial vehicle 109, as may be appreciated. In some embodiments, the device control API 196 may be invoked to adjust a motor speed setting of the unmanned aerial vehicle 109, update firmware or software of the unmanned aerial vehicle 109, adjust a setting of an onboard camera of the unmanned aerial vehicle 109, adjust a battery setting of a battery of the unmanned aerial vehicle, or other task described herein.

The unmanned aerial vehicle 109 may further include a UAV data store 198 in some embodiments. The UAV data store 198, like the data store 150 of the computing environment 103, may include memory storage of a physical memory device in some embodiments. In various embodiments, the UAV data store 198 may include a whitelist, which includes a listing of trusted certificate authorities. As such, when a client device 106 attempts to establish communication with the unmanned aerial vehicle 109, the unmanned aerial vehicle 109 may be configured to determine whether a signor or other entity associated with the digital certificate 140 matches one of the listings of trusted certificate authorities. Assuming the digital certificate 140 is signed be a trusted certificate authority, a user of the client device 106 may be permitted to access, collect data from, configure, or otherwise interact with the unmanned aerial vehicle 109.

Figure 3:
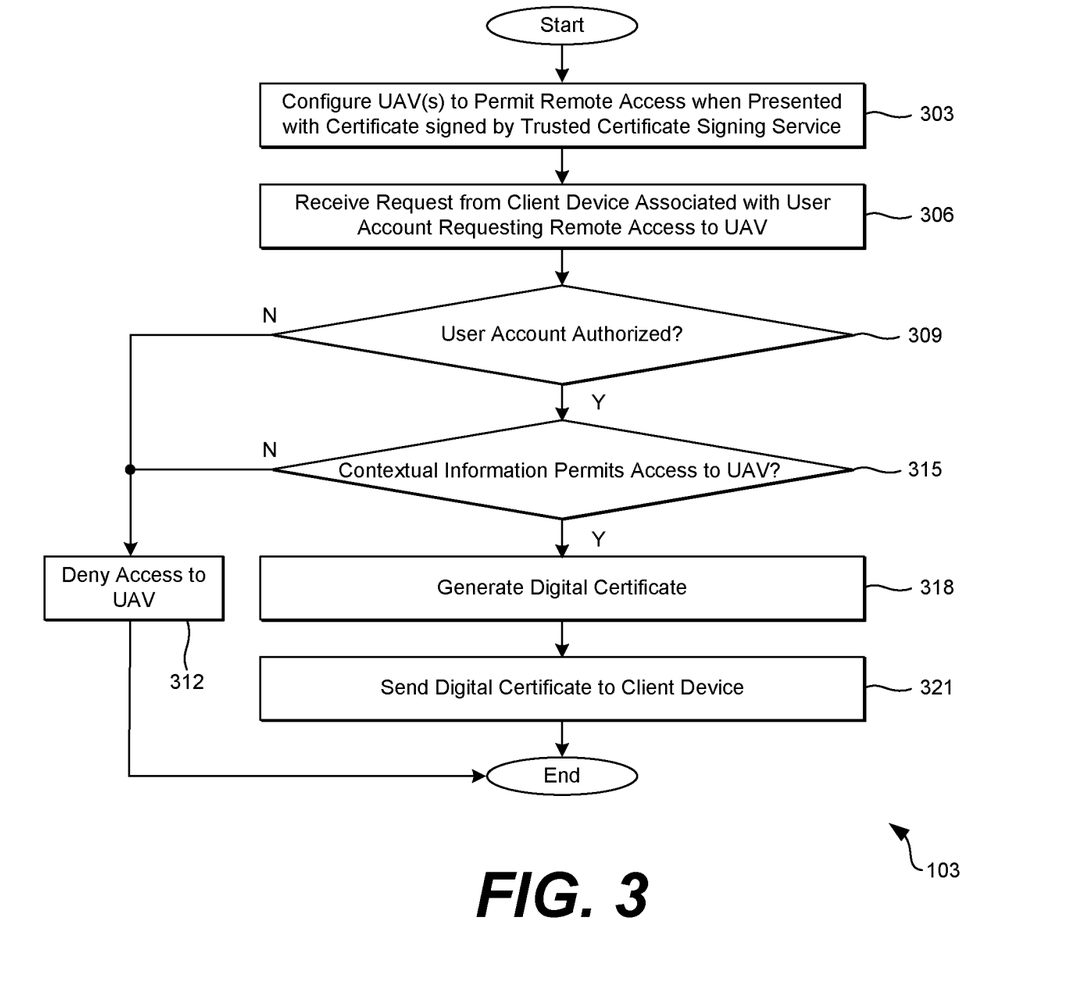
FIGS. 3 and 4 are flowcharts illustrating examples of functionality implemented as portions of a trusted certificate signing service executed in a computing environment in the networked environment of FIGS. 1 and 2 according to various embodiments of the present disclosure.

Referring next to FIG. 3, shown is a flowchart that provides one example of the operation of a portion of the certificate signing service 130 according to various embodiments. It is understood that the flowchart of FIG. 3 provides merely an example of the many different types of functional arrangements that may be employed to implement the operation of the portion of the certificate signing service 130 as described herein. As an alternative, the flowchart of FIG. 3 may be viewed as depicting an example of elements of a method implemented in the computing environment 103 according to one or more embodiments.

Beginning with 303, one or more of the unmanned aerial vehicles 109 may be configured to permit remote access when presented with a digital certificate 140 signed by the certificate signing service 130 or other trusted service. In some embodiments, an unmanned aerial vehicle 109 is configured by the computing environment 103 by installing an application, operating system, or other software component thereon that directs the unmanned aerial vehicle 109 to analyze digital certificates 140 when they are received and determine whether a source or signor of the digital certificate 140 is trustworthy. To this end, a list of trustworthy certificate authorities (also referred to as a whitelist) may be stored in memory of the unmanned aerial vehicle 109, in some embodiments, for comparison with incoming digital certificates 140.

Additionally, in some embodiments, the unmanned aerial vehicles 109 may be configured by communicating one or more public keys 164 to the unmanned aerial vehicles 109 for local storage. The public keys 164 may be used by the unmanned aerial vehicles 109 to communicate with a client device 106 via one or more encryption protocols. Further, in some embodiments, the unmanned aerial vehicles 109 may be configured by installing a one-time password decryption service on the unmanned aerial vehicles 109. The one-time password description service may determine whether to authenticate a client device 106 based on the one-time password, as will be described.

Next, in 306, the computing environment 103, acting as a central authentication service, may receive a request from a client device 106 requesting remote access to the unmanned aerial vehicle 109. The client device 106 may be associated with a user account, such as a user account of an administrator desiring to access an unmanned aerial vehicle 109 to download data, update software, adjust hardware settings, or perform other tasks as may be appreciated. In some embodiments, the client device 106 provides a public key 164 in or contemporaneously with the request. The public key 164 may be unique to a user account in some embodiments.

Next, in 309, the computing environment 103 may determine whether the user account is authorized to remotely configure the unmanned aerial vehicle 109. In other words, the computing environment 103 may determine whether the user account has sufficient permissions to access or remotely configure one or more of the unmanned aerial vehicles 109.

The client device 106, or a user account associated therewith, may be authenticated based on a role associated with the user account, a one-time password, a type of local authentication performed on the client device 106, a current location of the unmanned aerial vehicle. For instance, in some embodiments, a type of local authentication that may be used to determine whether to authenticate the user account, may include a two-factor authentication performed locally on a client device 106. In other words, to authenticate the user account, the computing environment 103 may determine whether a user of the client device 106 has performed a two-factor authentication on the client device 106.

In another embodiment, the computing environment 103 may determine whether a user account originating the request has sufficient permission to access or configure unmanned aerial vehicles 109 at a particular location or within a predetermined distance from the location. For example, in some embodiments, a user account for an administrator may only be permitted to configure unmanned aerial vehicles 109 at a particular fulfillment center (FC), hangar, warehouse, or other location. In additional embodiments, a user account for an administrator may only be permitted to configure unmanned aerial vehicles 109 associated with a particular business or user group.

If the user account is not authorized to remotely configure the unmanned aerial vehicle 109, or if the authentication process otherwise fails, the process may proceed to 312. In 312, the computing environment 103 may deny access to the unmanned aerial vehicle 109. Further, in some embodiments, the computing environment 103 may send a notification to the client device 106 indicating that authentication of the client device 106 (or the corresponding user account) failed. Thereafter, the process may proceed to completion.

Referring back to 309, if the user account is successfully authenticated, the process may proceed to 315. In 315, the computing environment 103 may determine whether contextual information associated with the requested received in 306 permits access to the unmanned aerial vehicle 109. In some embodiments, contextual information may include a time the request was submitted. For instance, if an administrator is requesting access to an unmanned aerial vehicle 109 outside of normal business hours, the request may be denied. In another embodiment, contextual information may include a location of the client device 106 when the request was received in 306. For instance, if an administrator is using a client device 106 in an unauthorized location, the computing environment 103 may deny access to the unmanned aerial vehicle 109.

In yet another embodiment, contextual information may include whether a user account is attempting to access an unmanned aerial vehicle 109 not in a fleet authorized for the user account. In other words, if a user account for an administrator is permitted only to configure unmanned aerial vehicles 109 in Fleet A, and the user account requests access to configure an unmanned aerial vehicle 109 in Fleet B, the computing environment 103 may deny access to the unmanned aerial vehicle 109.

If the computing environment 103 determines that the contextual information regarding the request does not permit access to the unmanned aerial vehicle 109, the process may proceed to 312. Again, in 312, the computing environment 103 may deny access to the unmanned aerial vehicle 109 and may send a notification to the client device 106 indicating that authentication of the client device 106 (or the corresponding user account) failed. Thereafter, the process may proceed to completion.

Referring back to 315, if the contextual information regarding the request permits access to the unmanned aerial vehicle 109, the process may proceed to 318. In 318, the computing environment 103 may generate a digital certificate 140 that permits the unmanned aerial vehicle 109 to communicate with the client device 106. Further, the digital certificate 140 may provide one or more cryptographic keys used for encrypting and decrypting communications sent between the unmanned aerial vehicle 109 and the client device 106. The generation of the digital certificate 140 is further described below with reference to FIG. 4.

Thereafter, in 321, the computing environment 103 may send the digital certificate 140 generated in 318 to the client device 106 that initiated the request. As may be appreciated, the client device 106 may use the digital certificate 140 to communicate directly with the unmanned aerial vehicle 109. To do so, the client device 106 may send the digital certificate 140 to the unmanned aerial vehicle 109 and a public key 164 and/or a private key 173 may be used to encrypt and decrypt communications between the client device 106 and the unmanned aerial vehicle 109.

Figure 4:
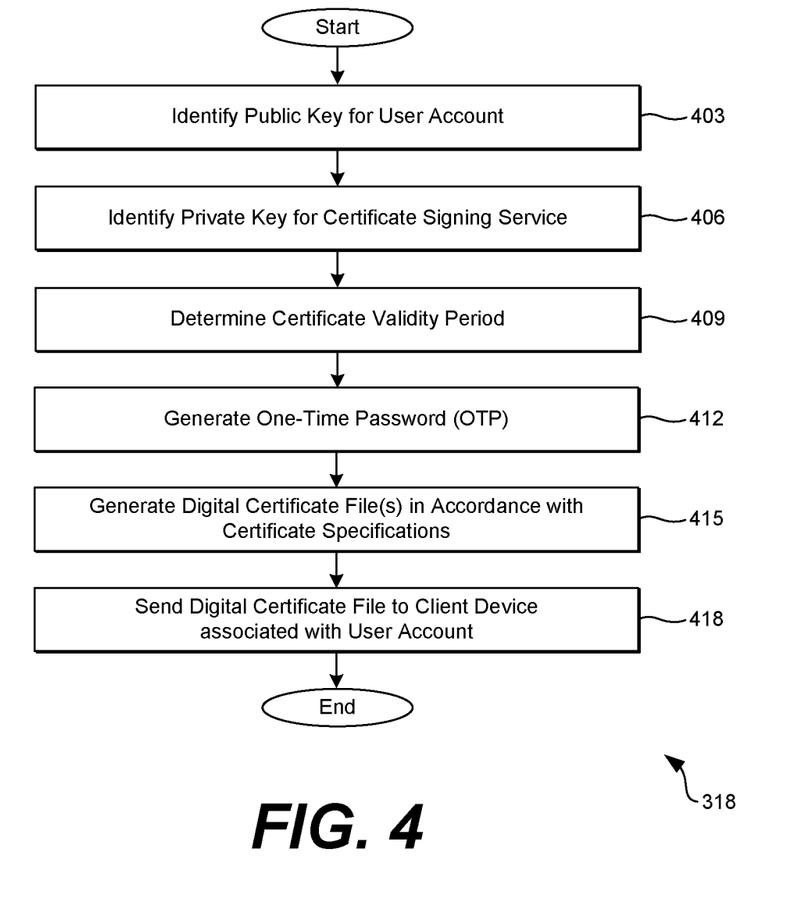

Referring next to FIG. 4, shown is a flowchart that provides another example of the operation of a portion of the certificate signing service 130 according to various embodiments. It is understood that the flowchart of FIG. 4 provides merely an example of the many different types of functional arrangements that may be employed to implement the operation of the portion of the certificate signing service 130 as described herein. As an alternative, the flowchart of FIG. 4 may be viewed as depicting an example of elements of a method implemented in the computing environment 103 according to one or more embodiments.

As noted above, in some embodiments, the digital certificate 140 may include a public-key certificate. Beginning with 403, the computing environment 103 may identify a public key 164 for a user account requesting access to an unmanned aerial vehicle 109. As noted above, in some embodiments, a public key 164 may be unique to a user account and may be stored as user account data 170 in the data store 150. Further, in some embodiments, the public key 164 may be maintained on a client device 106 and transmitted to the computing environment 103 along with a request to sign or retrieve a digital certificate 140.

Next, in 406, the computing environment 103 may identify a private key 173. In some embodiments, the private key 173 may include a cryptographic key unique to the certificate signing service 130 or a server on which the certificate signing service 130 is executing. In some embodiments, the public key 164 may be encrypted with the private key 173 in the digital certificate 140.

Thereafter, in 409, the computing environment 103 may determine a validity period 161. The validity period 161 may include a predetermined period of time for which the digital certificate 140 is valid to access or configure an unmanned aerial vehicle 109. In some embodiments, the validity period 161 may include a "not before" value specifying a time before the digital certificate 140 is valid as well as a "not after" value specifying a time after the digital certificate 140 has expired.

In some embodiments, in 412, the computing environment 103 may generate a one-time password. The one-time password may provide an additional feature of security when validating the digital certificate 140 on the unmanned aerial vehicle 109.

In 415, the computing environment 103 may generate a file for a digital certificate 140 in accordance with one or more certificate standards, specifications, or formats. In some embodiments, the digital certificate 140 may be generated in accordance with the X.509 certificate standard defined by the International Telecommunications Union's Standardization sector (ITU-T).

In 418, the digital certificate 140 may be sent to the client device 106 associated with the user account that originated the request. As may be appreciated, the digital certificate 140 enables encrypted communication to occur between the client device 106 and one or more of the unmanned aerial vehicle 109. In some embodiments, remote configuration of an unmanned aerial vehicle may occur while the unmanned aerial vehicle 109 is located in a predetermined region or at a predetermined location, such as a warehouse or a fulfillment center. Thereafter, the process may proceed to completion.

Figure 5:
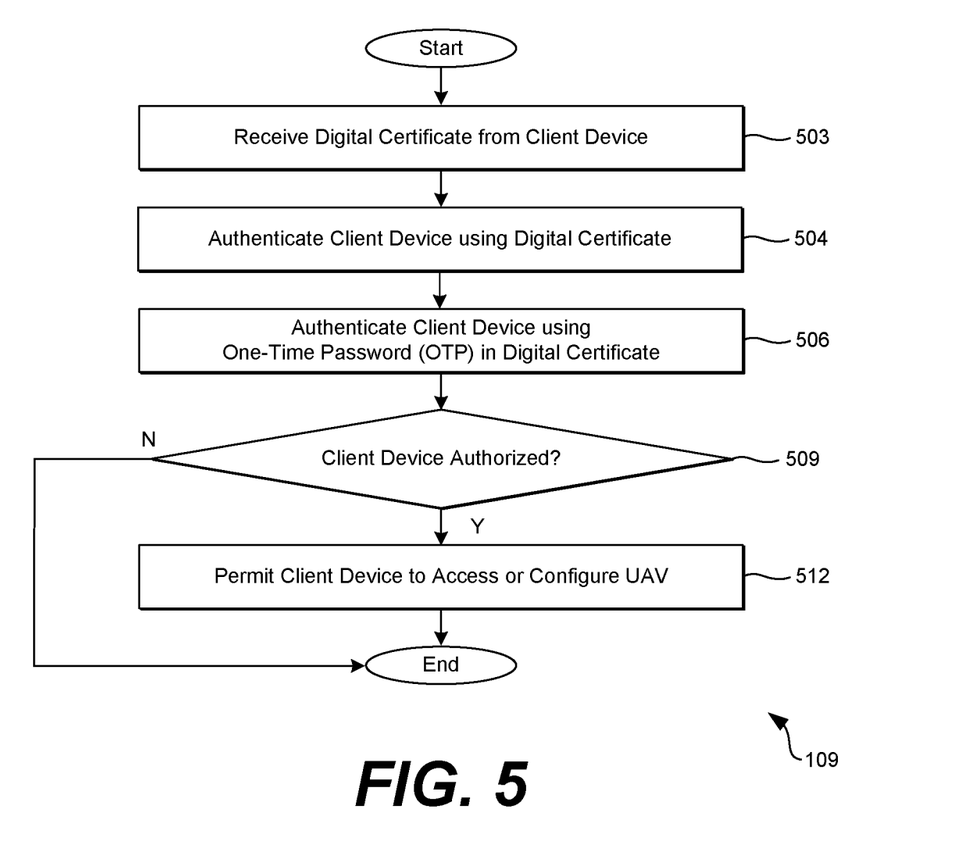
FIG. 5 is a flowchart illustrating examples of functionality implemented as portions of an unmanned aerial vehicle in the networked environment of FIGS. 1 and 2 according to various embodiments of the present disclosure.

Turning now to FIG. 5, a flowchart is shown that provides an example of the operation of a portion of the unmanned aerial vehicle 109 according to various embodiments. It is understood that the flowchart of FIG. 5 provides merely an example of the many different types of functional arrangements that may be employed to implement the operation of the portion of the unmanned aerial vehicle 109 as described herein. As an alternative, the flowchart of FIG. 5 may be viewed as depicting an example of elements of a method implemented in the processing circuitry 192 of the unmanned aerial vehicle 109 according to one or more embodiments.

As noted above, the unmanned aerial vehicle 109 may be configured to trust communications sent using a digital certificate 140 signed by a certificate authority service 130. In some embodiments, a configuration of the unmanned aerial vehicle 109 may include an installation of an application, service, or API (e.g., device control API 196) that analyzes digital certificates 140 when they are received. In some embodiments, upon verification of the digital certificate 140, the client device 106 is authorized to access the unmanned aerial vehicle 109 using the SSH protocol or other client application or service.

Beginning with 503, the unmanned aerial vehicle 109 may receive a digital certificate 140 from a client device

106. As may be appreciated, the digital certificate 140 may include one signed by a certificate authority service 130 that is trusted or another certificate authority that is unknown or untrusted.

Thereafter, in 504, the unmanned aerial vehicle 109 may authenticate the client device 106 from which the digital certificate 140 is received based on the digital certificate 140 and the information associated therewith. For instance, an identifier for a certificate authority may be compared to a local database of trusted certificate authorities. In addition, the unmanned aerial vehicle 109 may require the client device 106 to successfully provide the one-time password optionally included in the digital certificate 140 in various embodiments.

In some embodiments, a two-factor authentication may be performed on the unmanned aerial vehicle 109, for instance, to authenticate the client device 106. As such, in step 506, the unmanned aerial vehicle 109 may authenticate the client device 106 based on the one-time password included in the digital certificate 140 in addition to an inspection of the digital certificate 140.

In 509, the unmanned aerial vehicle 109 may determine whether the client device 106 is authorized to access or configure the unmanned aerial vehicle 109, for instance, based on the digital certificate 140, the one-time password, information associated with the client device 106, a geographic location of the unmanned aerial vehicle 109, as well as other information. If the client device 106 is not authorized to access or configure the unmanned aerial vehicle 109 based on the foregoing the process may proceed to completion.

Referring again to 509, if the client device 106 is authorized to access or configure the unmanned aerial vehicle 109 based on the foregoing, the process may proceed to 512. In 512, the unmanned aerial vehicle 109 may permit the client device 106 to access or configure the unmanned aerial vehicle 109 or perform other tasks. A configuration of an unmanned aerial vehicle may include adjusting of a motor speed setting of the unmanned aerial vehicle, updating firmware or software of the unmanned aerial vehicle, adjusting a setting of an onboard camera of the unmanned aerial vehicle, adjusting a battery setting of a battery of the unmanned aerial vehicle, updating a flight setting or otherwise adjusting a setting that relates to navigation of the vehicle, or other task as may be appreciated.

Figure 6:
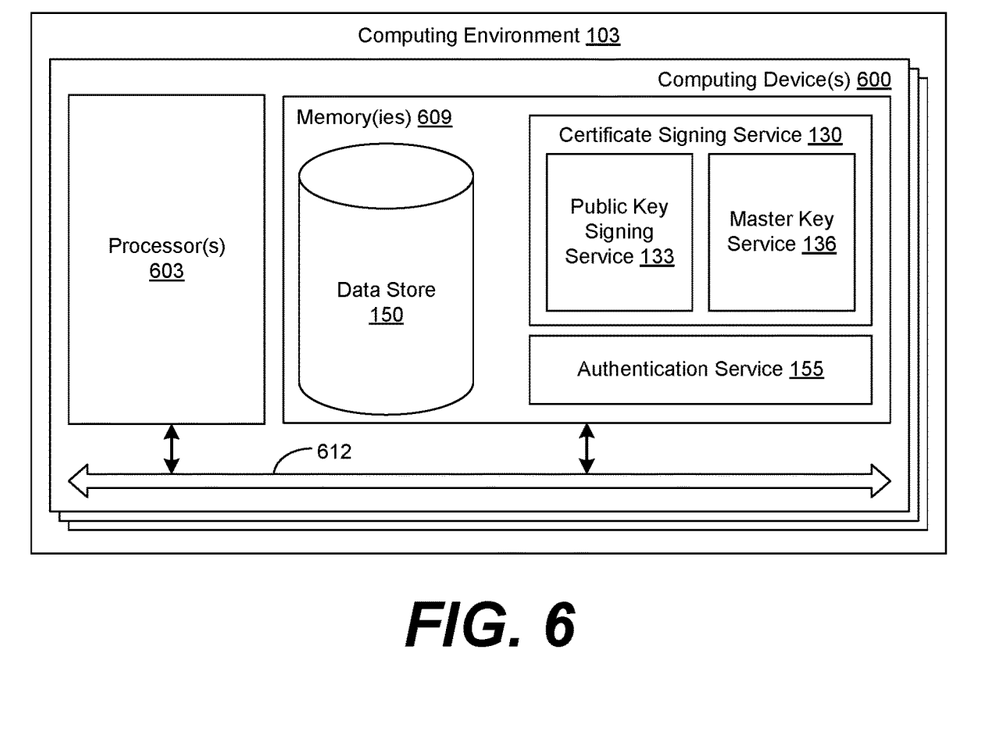
FIG. 6 is a schematic block diagram that provides one example illustration of the computing environment employed in the networked environment of FIGS. 1 and 2 according to various embodiments of the present disclosure.

With reference to FIG. 6, shown is a schematic block diagram of the computing environment 103 according to an embodiment of the present disclosure. The computing environment 103 includes one or more computing devices 600. Each computing device 600 includes at least one processor circuit, for example, having a processor 603 and a memory 609, both of which are coupled to a local interface 612. To this end, each computing device 600 may comprise, for example, at least one server computer or like device. The local interface 612 may comprise, for example, a data bus with an accompanying address/control bus or other bus structure as can be appreciated.

Stored in the memory 609 are both data and several components that are executable by the processor 603. In particular, stored in the memory 609 and executable by the processor 603 are the certificate signing service 130, the public key signing service 133, the master key service 136, the authentication service 155, and potentially other applications. Also stored in the memory 609 may be a data store 150 and other data. In addition, an operating system may be stored in the memory 609 and executable by the processor 603.

It is understood that there may be other applications that are stored in the memory 609 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 609 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 609 and run by the processor 603, source code that may be expressed in proper format such as object code that is capable of being loaded into a random access portion of the memory 609 and executed by the processor 603, or source code that may be interpreted by another executable program to generate instructions in a random access portion of the memory 609 to be executed by the processor 603, etc. An executable program may be stored in any portion or component of the memory 609 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 609 is defined herein as including both volatile and nonvolatile memory and data storage components. Volatile components are those that do not retain data values upon loss of power. Nonvolatile components are those that retain data upon a loss of power. Thus, the memory 609 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 609 may represent multiple memories 609 that operate in parallel processing circuits, respectively. In such a case, the local interface 612 may be an appropriate network that facilitates communication between any two of the multiple processors 603, between any processor 603 and any of the memories 609, or between any two of the memories 609, etc. The local interface 612 may comprise additional systems designed to coordinate this communication, including, for example, performing load balancing. The processor 603 may be of electrical or of some other available construction.

Although the certificate signing service 130, the public key signing service 133, the master key service 136, the authentication service 155, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3, 4, and 5 show the functionality and operation of an implementation of portions of the computing environment 103 and the unmanned aerial vehicle 109. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3, 4, and 5 show a specific order of execution, it is understood that the order of execution may differ from that which is depicted. For example, the order of execution of two or more blocks may be scrambled relative to the order shown. Also, two or more blocks shown in succession in FIGS. 3, 4, and 5 may be executed concurrently or with partial concurrence. Further, in some embodiments, one or more of the blocks shown in FIGS. 3, 4, and 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the certificate signing service 130, the public key signing service 133, the master key service 136, and the authentication service 155, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the certificate signing service 130, the public key signing service 133, the master key service 136, and the authentication service 155, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying program instructions executable in at least one computing device that, when executed, direct the at least one computing device to:
  configure an unmanned aerial vehicle to permit remote access to the unmanned aerial vehicle when presented with a certificate signed by a trusted certificate signing service, wherein the unmanned aerial vehicle is configured to permit remote access at least by initializing a one-time password decryption service on the unmanned aerial vehicle;
  store user account data for a user account associated with a client device in a data store, wherein the user account data stored in the data store comprises a role associated with the user account;
  receive a request from the client device in which the user account associated with the client device requests remote access to at least the unmanned aerial vehicle;
  authenticate the client device based at least in part on the role having a security level associated with the user account meeting a security level threshold and a two-factor authentication performed locally on the client device;

in response to the client device being authenticated, generate a public-key certificate signed by the trusted certificate signing service that is unique to the user account, wherein the public-key certificate comprises a one-time password, a public key generated for the user account, and a validity period during which the public-key certificate is valid; and send the certificate to the client device that enables encrypted communications between the client device and the unmanned aerial vehicle in response to the one-time password of the public-key certificate being received by the unmanned aerial vehicle from the client device.

2. The non-transitory computer-readable medium of claim 1, wherein the client device is further authenticated upon a determination that the unmanned aerial vehicle is at a first authorized predetermined location, the client device is at a second authorized predetermined location, and the unmanned aerial vehicle is in a fleet of unmanned aerial vehicles permitted to by accessed by the user account.

3. The non-transitory computer-readable medium of claim 1, wherein the at least one computing device is further directed to store data representing that the security level associated with the user account indicates that the user account has sufficient permissions to access the unmanned aerial vehicle.

4. A system, comprising:
at least one computing device; and
program instructions stored in memory and executable in the at least one computing device that, when executed, direct the at least one computing device to:
configure an unmanned aerial vehicle to permit access to the unmanned aerial vehicle when presented with a digital certificate signed by a trusted certificate signing service, wherein the unmanned aerial vehicle is configured to permit remote access at least by initializing a one-time password decryption service on the unmanned aerial vehicle;
authenticate a client device requesting access to the unmanned aerial vehicle to perform a configuration of the unmanned aerial vehicle based at least in part on a role access from a data store having a security level associated with the client device meeting a security level threshold and a local authentication performed locally on the client device;
in response to the client device being authenticated, generate the digital certificate signed by the trusted certificate signing service, the digital certificate comprising a one-time password; and
send the certificate to the client device that enables encrypted communications between the client device and the unmanned aerial vehicle in response to the one-time password of the digital certificate being received by the unmanned aerial vehicle from the client device.

5. The system of claim 4, wherein the access to the unmanned aerial vehicle permitted comprises remote access performed using a secure socket shell (SSH) protocol or remote access to an application of the unmanned aerial vehicle.

6. The system of claim 4, wherein:
the unmanned aerial vehicle is one of a plurality of unmanned aerial vehicles; and
the digital certificate enables encrypted communications between the client device and a subset of the plurality of unmanned aerial vehicles.

7. The system of claim 6, wherein the subset of the plurality of unmanned aerial vehicles are identified as being at a same predetermined location or a same region.

8. The system of claim 7, wherein the same predetermined location comprises a fulfillment center (FC).

9. The system of claim 4, wherein the configuration of the unmanned aerial vehicle comprises at least one of: adjusting a motor speed setting of the unmanned aerial vehicle; updating firmware of the unmanned aerial vehicle;
adjusting a setting of an onboard camera of the unmanned aerial vehicle; adjusting a battery setting of a battery of the unmanned aerial vehicle; and updating a flight setting of the unmanned aerial vehicle.

10. The system of claim 4, wherein the digital certificate further comprises a public key.

11. The system of claim 10, wherein the digital certificate further comprises:
the public key, wherein the public key is unique to a user account associated with the client device; and
a validity period determined for the digital certificate.

12. The system of claim 4, wherein the at least one computing device is further directed to configure the unmanned aerial vehicle to permit the client device to access the unmanned aerial vehicle when presented with the digital certificate in response to the digital certificate being signed by a trusted certificate signing service stored in memory of the unmanned aerial vehicle.

13. The system of claim 4, wherein the client device is further authenticated upon a determination that the unmanned aerial vehicle is at a first authorized predetermined location, the client device is at a second authorized predetermined location, and the unmanned aerial vehicle is in a fleet of unmanned aerial vehicles permitted to by accessed by the user account.

14. A computer-implemented method, comprising:
authenticating, by at least one server computing device, a client device based at least in part on a security level associated with a user account accessed from memory on the client device meeting a security level threshold and an authentication performed locally on the client device;
generating, by the at least one server computing device, a digital certificate in response to the client device being authenticated, the digital certificate comprising a one-time password;
sending, by the at least one server computing device, the digital certificate to the client device;
receiving, by an unmanned aerial vehicle comprising at least one hardware processor, the digital certificate from the client device;
authenticating, by the unmanned aerial vehicle, the client device based at least in part on the digital certificate and a comparison of a password received from the client device with the one-time password of the digital certificate; and
in response to the client device being authenticated, permitting, by the unmanned aerial vehicle, the client device to remotely configure at least one setting of the unmanned aerial vehicle for a predetermined amount of time.

15. The computer-implemented method of claim 14, wherein the authenticating comprises determining that a signor of the digital certificate is a trusted certificate signing service.

16. The computer-implemented method of claim 15, wherein the one-time password is specified in the digital certificate by the trusted certificate signing service.

17. The computer-implemented method of claim 16, wherein the digital certificate comprises a public-key certificate generated by the trusted certificate signing service.

18. The computer-implemented method of claim 14, wherein the at least one setting of the unmanned aerial vehicle configured by the client device comprises a flight setting configured during a flight of the unmanned aerial vehicle.

19. The computer-implemented method of claim 14, wherein the at least one setting is specified on the client device using at least one of: a secure socket shell (SSH) protocol, a client application, or an application programming interface (API).

20. The computer-implemented method of claim 14, further comprising configuring the unmanned aerial vehicle to permit the client device to access the unmanned aerial vehicle when presented with the digital certificate in response to the digital certificate being signed by a trusted certificate signing service stored in memory of the unmanned aerial vehicle.

\* \* \* \* \*